United States Patent
Ashley et al.

(10) Patent No.: US 11,107,177 B1
(45) Date of Patent: Aug. 31, 2021

(54) DATA/METADATA SYNCHRONIZATION USING METADATA QUEUE STATISTICS

(71) Applicant: Amazon Technologies, Inc., Seattle, WA (US)

(72) Inventors: William Ashley, Seattle, WA (US); Dharm Raj, Bellevue, WA (US)

(73) Assignee: Amazon Technologies, Inc., Seattle, WA (US)

(*) Notice: Subject to any disclaimer, the term of this patent is extended or adjusted under 35 U.S.C. 154(b) by 441 days.

(21) Appl. No.: 15/625,896

(22) Filed: Jun. 16, 2017

(51) Int. Cl.
*G06T 1/20* (2006.01)
*G06F 3/0484* (2013.01)

(52) U.S. Cl.
CPC ............ *G06T 1/20* (2013.01); *G06F 3/04847* (2013.01)

(58) Field of Classification Search
CPC .............................. G06T 1/20; G06F 3/04847
See application file for complete search history.

(56) References Cited

U.S. PATENT DOCUMENTS

| | | | | |
|---|---|---|---|---|
| 7,120,924 B1* | 10/2006 | Katcher | ............ | G06F 17/30855 725/60 |
| 2009/0141033 A1* | 6/2009 | Street | ............ | G06T 1/20 345/506 |
| 2012/0002953 A1* | 1/2012 | Mckiel, Jr. | ............ | H04N 5/783 386/345 |
| 2012/0081385 A1* | 4/2012 | Cote | ............ | H04N 5/23219 345/589 |
| 2014/0086446 A1* | 3/2014 | Han | ............ | H04N 9/8205 382/100 |
| 2014/0306971 A1* | 10/2014 | Frascati | ............ | G06T 11/40 345/522 |
| 2015/0327197 A1* | 11/2015 | Anderson | ............ | H04W 56/005 370/328 |
| 2016/0294910 A1* | 10/2016 | Li | ............ | H04L 65/607 |
| 2017/0244775 A1* | 8/2017 | Ha | ............ | G06T 19/006 |
| 2017/0289609 A1* | 10/2017 | Liu | ............ | H04N 21/4307 |
| 2017/0289646 A1* | 10/2017 | Kanthapanit | ............ | H04N 21/8547 |

OTHER PUBLICATIONS

"Intel 360 Replay Technology", Retrieved from URL: http://www.intel.com/content/www/us/en/sports/360replaytechnologyoverview.html on May 31, 2017, pp. 1-6.

* cited by examiner

*Primary Examiner* — Kee M Tung
*Assistant Examiner* — Khoa Vu
(74) *Attorney, Agent, or Firm* — Robert C. Kowert; Kowert, Hood, Munyon, Rankin & Goetzel, P.C.

(57) ABSTRACT

Synchronizing data with metadata includes simultaneously triggering a metadata generation unit to produce metadata that are stored in a reliable metadata queue, and a data unit producing unit that produces data units that are processed in a lossy processing pipeline. A synchronizer obtains a processed data unit, and considers one or more statistics associated with the metadata queue to determine whether it is likely that a data unit was dropped by the lossy processing pipeline. For example, an increase in the depth of the queue may be used to infer that a data unit was dropped. If so, enough metadata entries may be dequeued such that the next metadata entry is correctly synchronized with the data unit. The synchronized data unit and metadata unit are output together. Another technique may take the output from two or more different systems and align data units from each system based on the metadata.

26 Claims, 8 Drawing Sheets

DATA/METADATA SYNCHRONIZATION USING METADATA QUEUE STATISTICS

BACKGROUND

Various data producing devices (e.g., sensors such as image sensors) produce data or streams of data that are processed. Some data producing devices and/or the associated forms of data processing (e.g., lossy image processing pipelines) may "drop" data. Subsequent processing of the data may be hindered by the dropped data. For example, multiple cameras may be arranged to each capture a common scene of interest, with each camera capturing the same scene from different viewpoints. Some uses of the captured images may rely upon synchronizing the image frames from each of the different cameras in time (e.g., security cameras, sporting event instant replays, etc.).

Data producing devices that do not provide metadata about the produced data can make synchronization of the produced data difficult, especially when the data requiring synchronization is produced by data producing devices that feed different types of data processing units that drop data and may take various amounts of time to perform the processing. In some systems, the data from different sources must be synchronized subsequent to processing, despite the data from the different sources being generated at the same moment in time. Repeated data drops may cause errors to accumulate downstream, in some systems.

Figure 1:
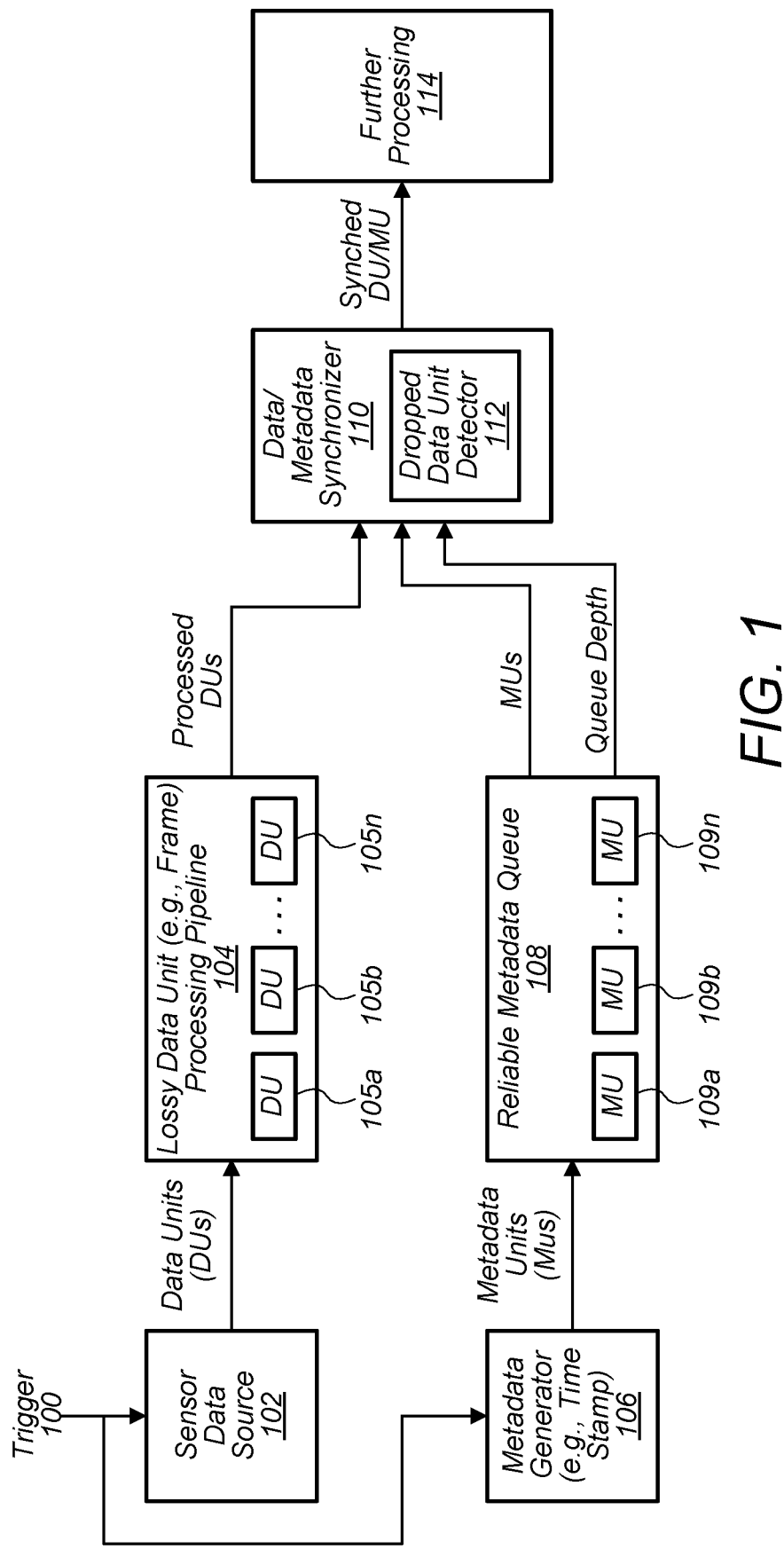
FIG. 1 illustrates a system for data/metadata synchronization using metadata queue statistics, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments describe systems and processes associated with data/metadata synchronization using metadata statistics such as queue depth. At least some data producing devices that generate data provide little or no metadata along with the data. For instance, some sensors or other type of data producing device may (e.g., image sensors, weather sensors, motion sensors, etc.) produce data without providing metadata (e.g., a timestamp, location information, sensor type, etc.).

Various forms of processing of the produced data may benefit from or require metadata about the data. For example, using a number of image sensors (image sensors that do not timestamp image frames) as an example data source and using time synchronization of the images from the distinct image sensors as the desired processing goal, it is a challenge to time synchronize the data from the various image sensors without the data having timestamp metadata. For example, even if the sensors are triggered at the same time, the data produced by the sensors may be received at different times (e.g., data processing pipelines may take different lengths of time to process the data; data from the image sensors may be dropped during the processing or elsewhere; etc.). In some instances, it may be desirable to synchronize or match data from different types of sensors (e.g., sensors that produce data at distinct rates or based on distinct triggers).

Embodiments of techniques described herein include, in response to a concurrent trigger, repeatedly obtaining data units from a data source (e.g., a data unit processing pipeline), and repeatedly placing metadata from the obtained data unit in a metadata queue. In embodiments, the techniques include taking an obtained data unit and a corresponding metadata from the queue to form a synchronized data/metadata. In embodiments, the techniques may include determining a queue depth for a metadata queue, and determining a previous data unit loss based on the queue depth (for example, dropped data may result in an increased metadata queue depth because the dropped data fails to cause the corresponding metadata to be popped from the queue during synchronization). The techniques may further include discarding, based on the previous data unit loss, metadata units from the metadata queue, in embodiments (e.g., thereby making the number of metadata in the metadata queue match the expected number in the queue for regular operation of synchronization of the data and metadata, in embodiments). The techniques may also include retrieving the next metadata unit from the metadata queue as a metadata unit corresponding to a data unit, and transmitting the given data unit together with the corresponding metadata unit, in embodiments.

In an example embodiment, a number of image sensors produce image frames of a common scene (e.g., a common area of a room or other area) from various different viewpoints. The image sensors may produce the image frames without producing a corresponding time stamp, in embodiments. The image frames may be intended to provide a complete view of the scene at various points in time, in embodiments. Without time stamps, it can be difficult to determine which image frame from one viewpoint is to be matched with another image frame from another point of the scene for a particular point in time. Even if the image frames are produced at the same time, some image frames may be dropped or the image processing pipeline for one image sensor may take longer to process images than another one of the image sensors. Various types of image sensors (e.g., RGB image sensors, depth sensors such as stereoscopic infra-red, frequency, etc.) may require various lengths of time for processing or may have different data processing rates, or experience data drops from lossy processing pipelines, for instance. The output of the respective processing pipelines, even for image sensors that are triggered together, may output corresponding image frames at different times, in embodiments. Post-processing synchronization of the images produced by different image sensors without time stamps may be necessary, in embodiments.

Other example system environments are contemplated (e.g., the numerous sensors on self-driving vehicles, manufacturing environments, etc.) herein.

Various embodiments described herein provide combinations of systems, devices and techniques that generate and synchronize metadata (e.g., time stamps, locations, types of sensors, sensor environmental information, etc.) with generated data (e.g., image data, sensor data, etc.) based on analyzing characteristics of a queue of metadata corresponding to the generated data (e.g., characteristics such as a depth of the queue, rate of input to or output from the queue, and/or other statistical features of the queue like arrival rate, arrival time into the queue, clustering of time stamps, etc.). For instance, using the image sensor examples, a metadata generation unit (e.g., a time stamp generation unit or the like) may be repeatedly triggered concurrently with image sensor(s). The generated time stamp may be stored in a reliable queue while the image data from the image sensor(s) are processed in lossy image processing pipeline(s). A synchronizer may obtain an image frame from a processing pipeline and attempt to determine a time stamp from the metadata queue that indicates when the image was generated (e.g., for a common scene).

In some embodiments for example, at least for a system that generally runs in a steady state, the metadata queue and data processing pipeline may operate within some known parameters. For instance, over time, assuming no data drops in the pipeline, it may be observed that each time an image frame is obtained from the processing pipeline the metadata queue has a somewhat regular number of metadata units stored (e.g., 5, 50, or 500, etc.). In at least some embodiments, as long as the number of entries in the metadata queue remains fairly steady (when measured at the time the image data is obtained from the image data processing pipeline, it may be assumed that the time stamp to be popped off the queue is at least a good approximation of when the image data was capture, if not the accurate time itself, and the time stamp to be popped off the metadata queue may be associated with the image data obtained from the image processing pipeline.

In embodiments, if it is determined that a parameter of the metadata queue is not normal (e.g., a statistic such as the queue depth changes from its normal or average value, such as an exponential moving average) it may be assumed that even though a time stamp was triggered, a corresponding image frame was not captured or was dropped during processing or was otherwise lost prior to being obtained by the synchronizer. In at least this example, the number of entries in the metadata queue could grow larger than the average because of the missing dequeue operation caused by the dropped image frame, in embodiments.

FIG. 1 illustrates a system for data/metadata synchronization using metadata queue depth, according to some embodiments. The system and subcomponents illustrated in FIGS. 1 and 2 may be configured to perform the techniques illustrated in FIGS. 3 and 4. For instance, the trigger 100 may concurrently trigger data source 102 to provide data units and trigger a metadata source (e.g., a metadata generator 106) to provide metadata units (e.g., 109a-n) (FIG. 3, block 302). Example triggers include a hardware clock (e.g., pulse width modulator) or the like, for instance. The sensor 102 may be any type of sensor, such as an image sensor (RGB image sensor, depth sensor, etc.) environmental sensor, or the like, in embodiments. In some embodiments, the metadata generator may be a time stamp generator, but other forms of metadata may be generated without departing from the scope of the disclosure, such as data about the sensor or data from another sensor (e.g., e.g., environmental sensors such as a temperature sensor, or position sensors, such as gyroscopic, etc.). In embodiments, the type of metadata generator selected to be triggered concurrently with the sensor data source may be selected based on the reliability of the generator to produce the metadata. For instance, it may be desirable for the reliability of the metadata generator to be greater than the reliability of a lossy data unit processing pipeline (e.g., pipeline 104) that processes the data units concurrently generated by the sensor data source 102, in embodiments.

FIG. 1 illustrates that data units (e.g., DUs 105a-n) generated by the sensor data source 102 (e.g., when triggered by trigger 100) are processed in a potentially lossy data unit processing pipeline 104 (FIG. 3, block 304). As described above, the lossy data unit processing pipeline may be an image frame processing pipeline, in some embodiments. In embodiments, the lossy data unit processing pipeline 104 may lose or drop data units. For example, the pipeline may be configured to intentionally drop data units that cannot be processed (e.g., in order to maintain a processing rate, etc.) or data units may be unintentionally dropped due to errors or the like. Also illustrated, metadata units (MUs 109a-n) are queued in a reliable metadata queue 108 (FIG. 3, block 306). In embodiments, the number of metadata entries in the metadata queue may be approximated by the number of frames being processed in the processing pipeline. For example, the metadata units are waiting in the metadata queue for the corresponding data unit to be processed such that the metadata unit can be synchronized with the data unit that was generated at the same time, in embodiments. FIG. 3 illustrates that the processing of the data units and the queueing of the metadata may be performed at least somewhat concurrently (processing of the data units may take longer than placing the metadata units in a queue). In some embodiments, the processing and queueing take different data processing paths and each may be subject to varying processing rates. For instance, queuing of the metadata may be performed more quickly than the processing of the data units. Prior data units may continue to be processed by the lossy data unit processing pipeline 104 when a new metadata for the next data unit is triggered, in embodiments.

Data/metadata synchronizer 110 is illustrated in FIG. 1 and includes a dropped data unit detector 112. The data/metadata synchronizer 110 receives or obtains processed data units, metadata units and queue statistics such as queue depth and outputs synchronized data units with corresponding metadata units, in at least the illustrated embodiment.

Figure 2:
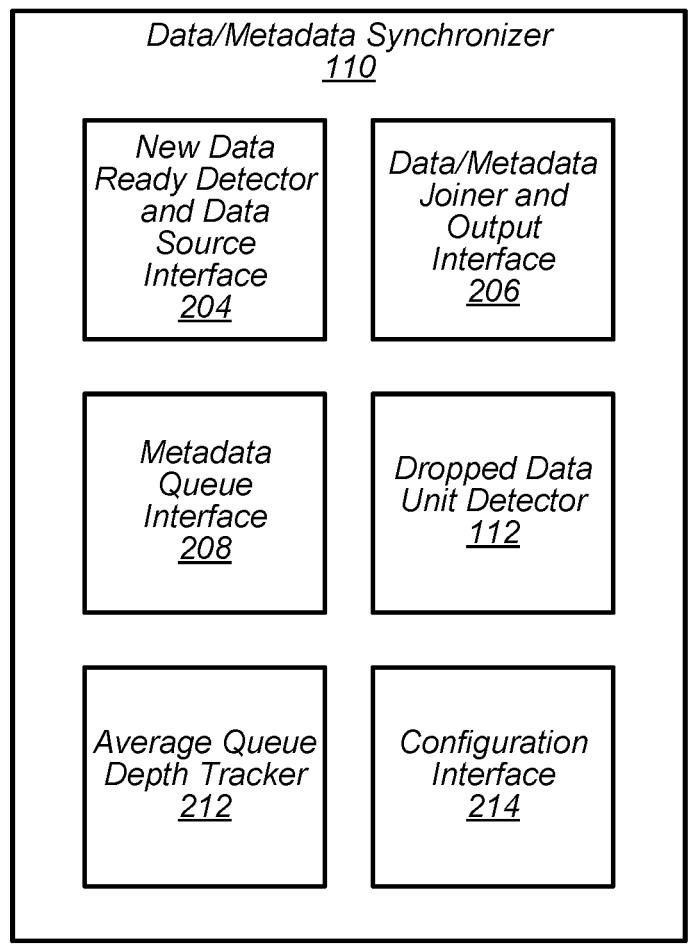
FIG. 2 illustrates a data/metadata synchronizer for data/metadata synchronization using metadata queue statistics, according to some embodiments.
Figure 3:
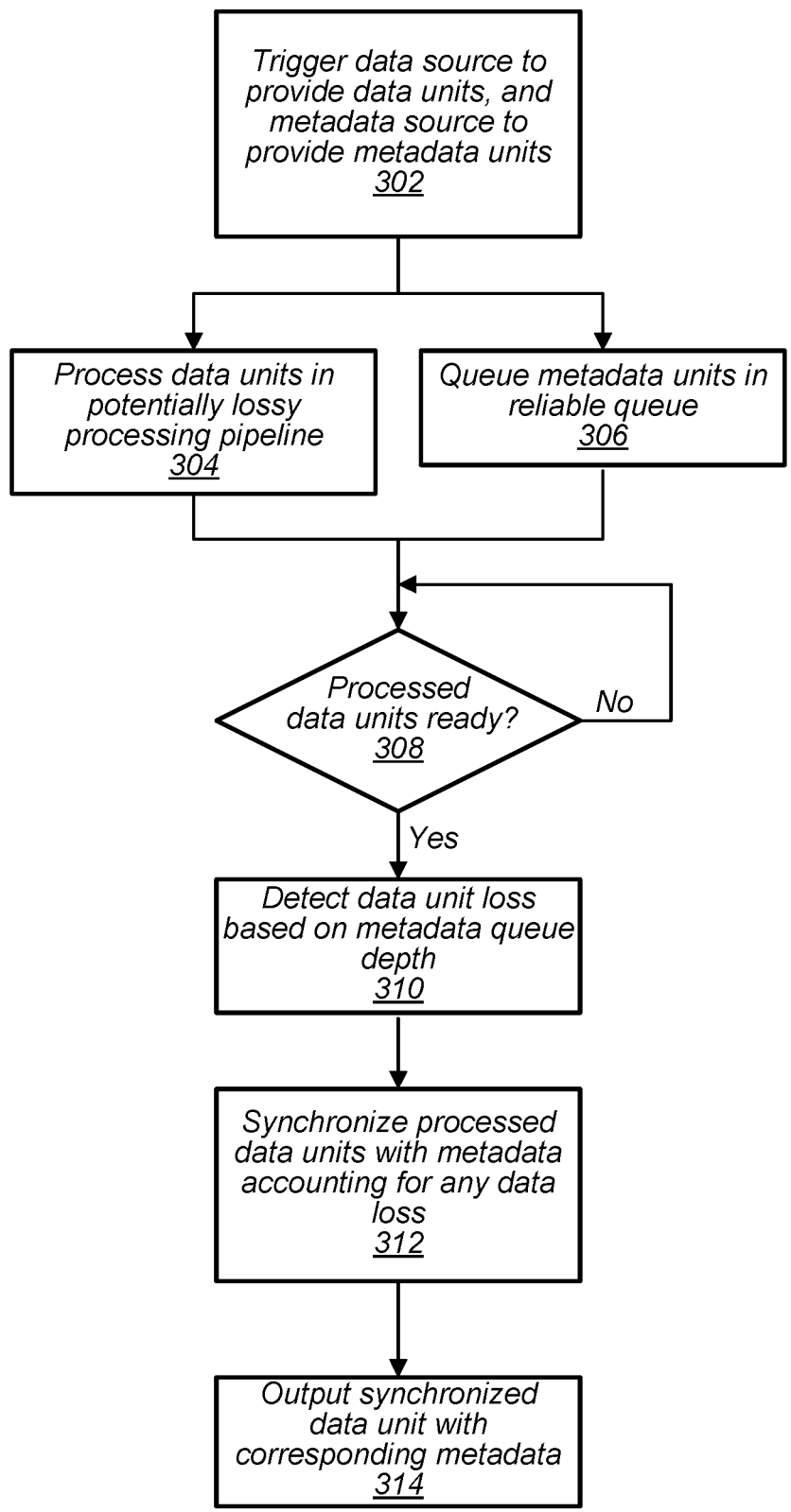
FIG. 3 is a method for performing data/metadata synchronization using metadata queue depth, according to some embodiments.

FIG. 2 illustrates a data/metadata synchronizer 110 for data/metadata synchronization using metadata queue depth, according to some embodiments. The data/metadata synchronizer 110 is depicted with new data ready detector and data source interface 204. The new data ready detector and data source interface may act an interface to the data unit and metadata unit sources, and may determine that the processed units are ready (block 308) and obtain (or receive) data units from the lossy data unit processing pipeline (e.g., via blocking reads), in embodiments. If a next processed data unit is not ready (block 308, no) the system may wait until the next processed data unit it available. In embodiments, the lossy data unit processing pipeline 104 may transmit the processed data units to the data metadata synchronizer 110 or the synchronizer may obtain data units from the pipeline based on some criteria (e.g., whenever a new data unit is detected as available, etc.).

The data/metadata synchronizer 110 is depicted with dropped data unit detector 112. Data unit loss may be detected based on the depth of the metadata queue as illustrated in block 310 (e.g., by the dropped data unit detector 112, in embodiments). For instance, data unit loss may be detected if the depth of the queue changes size (see FIG. 4). Block 312 of FIG. 3 illustrates that processed data units may be synchronized with metadata accounting for any data loss, and block 314 illustrates that the data unit and the corresponding metadata is output (e.g., by data/metadata joiner and output interface 206 as synched data unit/metadata unit for further processing 114). In some embodiments, the synched data unit/metadata unit may be transmitted to a cloud-based service provider for storage and/or further processing, for example. Other destinations are contemplated (e.g., an enterprise storage or processing facility, local storage and/or processing, or the like) without departing from the scope of this disclosure.

In at least some embodiments, the system or device may be configured with multiple sensors (e.g., multiple image sensors such as an RGB sensor and a depth image sensor) and one or more corresponding metadata generators, for example. Other arrangements are contemplated without departing from the scope of the disclosure.

Figure 4:
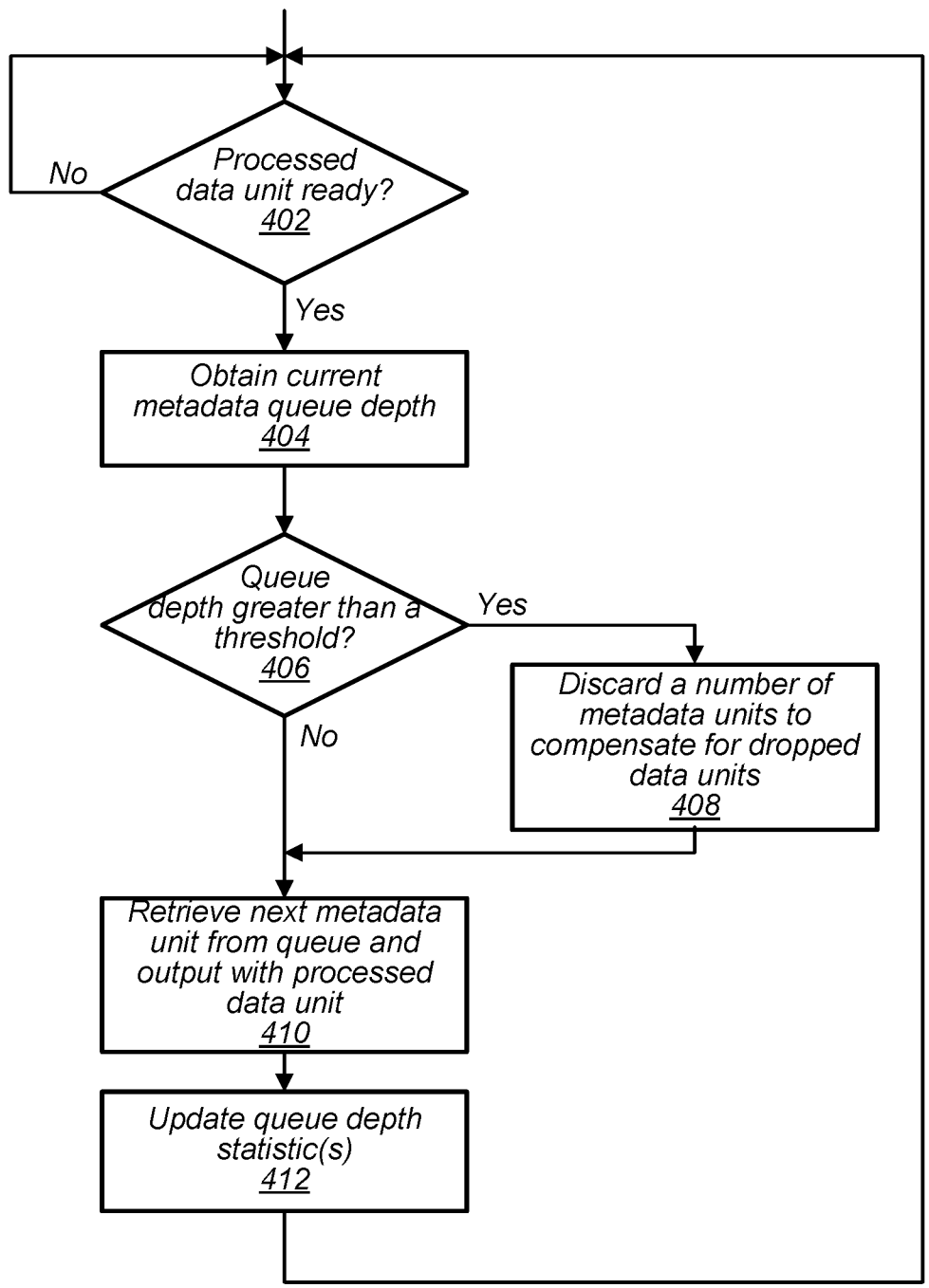
FIG. 4 is another method for performing data/metadata synchronization using metadata queue depth, according to some embodiments.

FIG. 4 is another method for performing data/metadata synchronization using metadata queue depth, according to some embodiments. FIG. 4 illustrates a particular implementation of steps 308-312, in embodiments. New data ready detector and data source interface 204 may determine whether processed data units are ready (block 402). If not, the system continues monitoring for or waits for a processed data unit to become ready (block 402, no). For a processed data unit that is ready (block 402, yes) the system may determine whether a prior data unit has been dropped by considering statistics associated with the metadata queue depth (e.g., determining whether the depth of the metadata queue is an expected value or not).

For instance, the data/metadata synchronizer 110 may be configured to determine and/or track statistics about the metadata queue. For instance, an average queue depth tracker 212 may monitor the queue depth over time (e.g., over repeated queue depth accesses during repeated data/metadata synchronizations) and determine an average or mean queue depth during normal or steady state operation of the system (over an average queue depth window of time, for example). In some embodiments, once an average queue depth has been established, the average queue depth parameter may be set to that average queue depth. In some embodiments, the average queue depth tracker 212 may continuously or semi-continuously update the average queue depth parameter. For instance, the average queue depth of the metadata queue may stay about the same when no data units are dropped, but may increase when data units that are generated by the sensor do not make it to the data/metadata synchronizer 110 (e.g., because the data capture failed at the sensor, because the processing pipeline dropped the data unit, because the data unit was not obtained before it was overwritten, etc.). In embodiments, at least because the metadata generator may be more reliable than the image sensor, the corresponding metadata of the dropped data unit may be more likely to make it to the queue, even when the corresponding data unit does not reach the output of the processing pipeline. In such a case, when a next data unit is obtained, the prior metadata unit will still be in the metadata queue waiting synchronization, but because the prior data unit was dropped, the metadata unit is not actually the correct metadata unit to be synchronized with the data unit. The dropped data unit detector 112 may determine that a data unit has been dropped when the queue depth is greater than a threshold value for at least this reason, in embodiments.

The threshold value may be a configurable parameter, in embodiments. The threshold value may be the average queue depth or may be set at some increment greater than the threshold value. The additional increment may account for variances in the system (e.g., short-term changes in processing rates or the like) in embodiments. In some embodiments, the configuration interface 214 (e.g., an API, or GUI, or the like) may be accessed or used to set such a threshold (e.g., by an administrator).

In at least the illustrated embodiment, the current queue depth of the metadata queue may be obtained (block 404). The data/metadata synchronizer 110 is depicted with metadata queue interface 208 that may be configured to respond to requests for metadata units by providing (e.g., popping) the next metadata unit in the queue, in embodiments. The metadata queue interface 208 may also be configured to respond to requests for statistics about the metadata queue by providing those statistics, such as by providing the currently depth of the queue, for example. The dropped data unit detector 112 may determine whether the queue depth is greater than the threshold (block 406). If it is (block 406, yes) the metadata queue interface 208 may be accessed (e.g., by the dropped data unit detector 112 of the data/metadata synchronizer 110) to discard a number of metadata units to compensate for dropped data units (block 408). For example, if more than one data unit has been dropped, then a corresponding number of metadata units will also be discarded such that the metadata units and the data units are correctly synchronized. Such a technique may avoid an accumulated error created by a number of otherwise unrecognized dropped data units over time.

In some embodiments, the threshold may be combined with heuristics to determine whether to discard metadata. For example, in at least some embodiments, it may be required that the depth of the queue be above some threshold for some period of time (e.g., a window) or for some number of time stamps before metadata units are discarded.

Subsequent to the discard of the metadata units (block 408), or if the queue depth is not greater than the threshold (block 406, no), the next metadata unit may be retrieved from the queue and output with the processed data unit (block 410). For instance, the data/metadata joiner and output interface 206 may retrieve both the next metadata units and the processed data unit and output them together. In some embodiments, an association between the metadata unit and the data unit may be generated and stored. In at least the illustrated embodiment, queue depth statistics (e.g., the mean or average queue depth) may be updated (block 412). For example, the average queue depth tracker may update the statistics, in embodiments. The process may repeat, with the system returning back to block 402 where the system determines whether the next data unit is ready, and so on, in embodiments.

Figure 5:
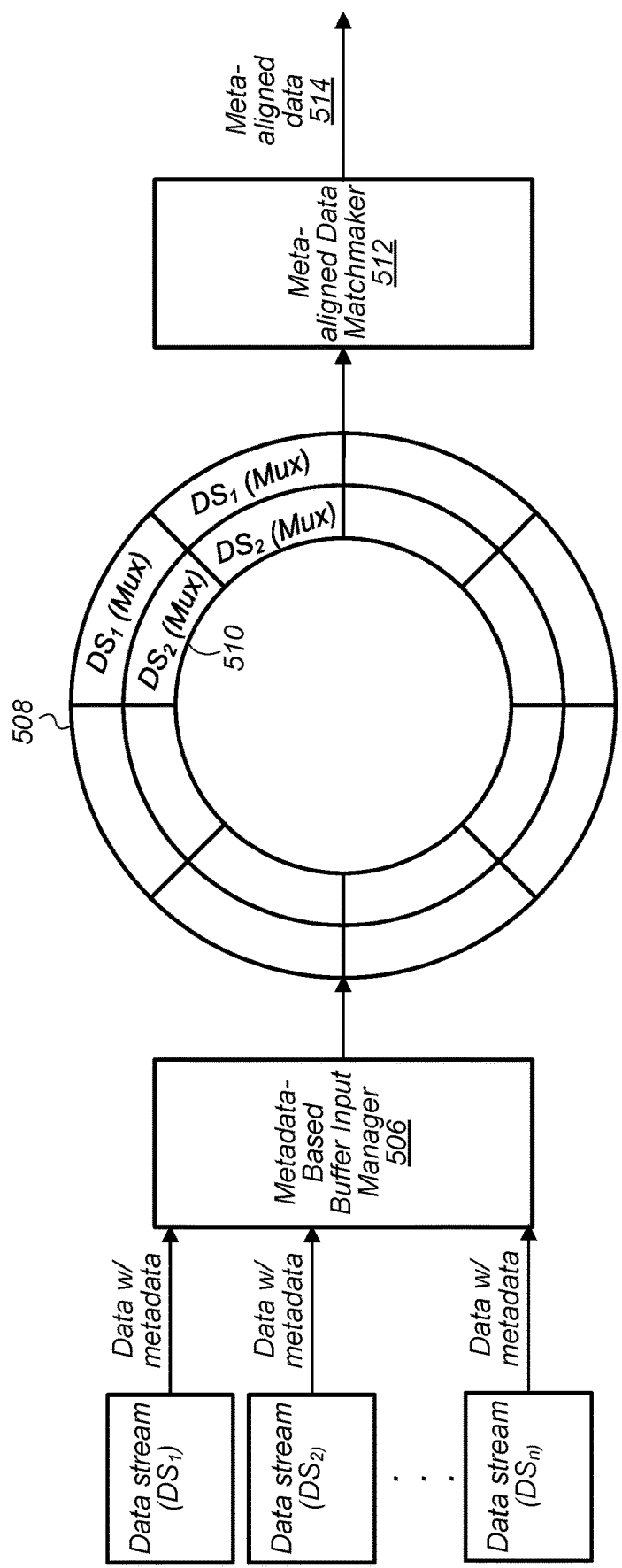
FIG. 5 is a data flow diagram illustrating the flow of synchronized data and corresponding metadata in the performance of matching the data from various different sources into meta-aligned data, according to some embodiments.
Figure 6:
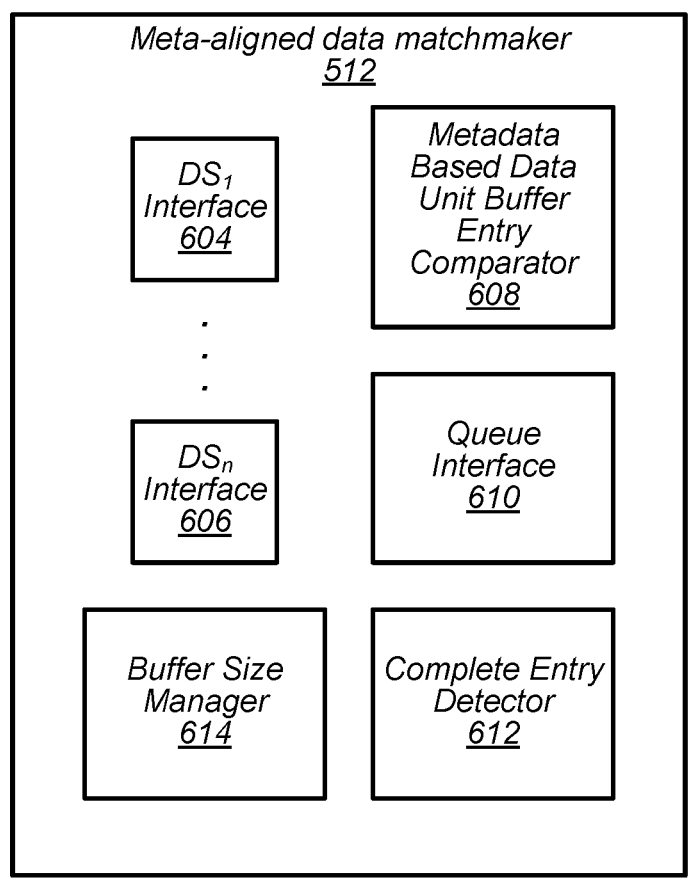
FIG. 6 is a block diagram of a meta-aligned data matchmaker, according to some embodiments.
Figure 7:
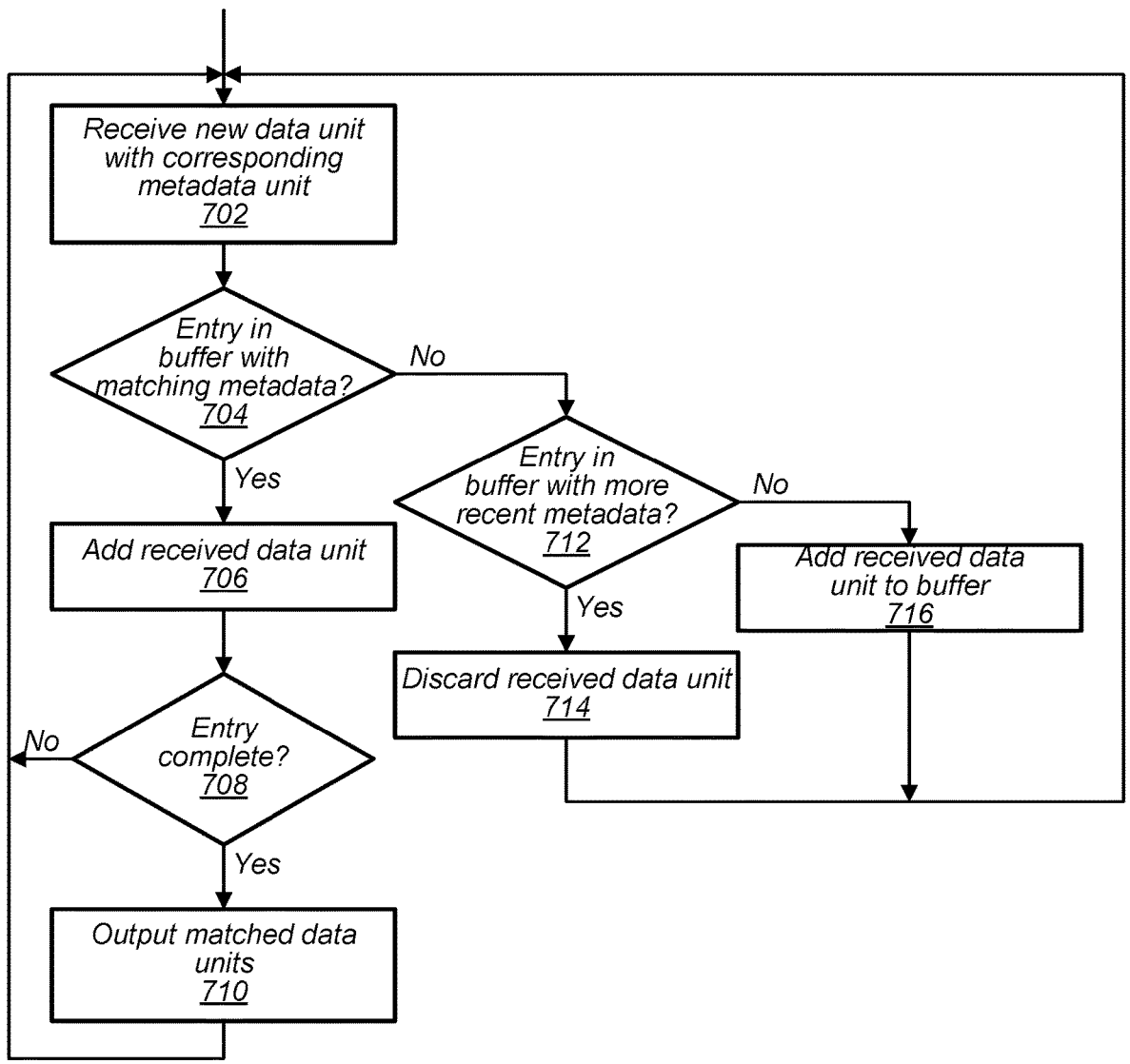
FIG. 7 is a flow diagram illustrating a process of matching the data from various different sources into meta-aligned data, according to some embodiments.

FIGS. 1-4 have illustrated systems and techniques for synchronizing metadata with data (e.g., when the metadata is not generated by the same device that generates the data). FIGS. 5-7 illustrate systems and techniques for matching data from various different data streams. For instance, using image data as an example, some image analysis uses image data from multiple different viewpoints of the captured scene. The analysis may require that the image data from the various different viewpoints be from the same point in time. FIGS. 5-7 illustrate particular techniques.

FIG. 5 is a data flow diagram illustrating the flow of synchronized data and corresponding metadata in the performance of matching the data from various different sources into meta-aligned data, according to some embodiments. FIG. 6 is a block diagram of a meta-aligned data matchmaker, components of which may perform various steps of the process of matching the data from various different sources into meta-aligned data illustrated in FIG. 7, according to some embodiments. The incoming data streams illustrated in FIG. 5 and processed in accordance with the embodiments depicted in FIGS. 6-7 may be the output of the Data/Metadata synchronizer 110 (the synched DU/MU sent to further processing 114) illustrated in FIG. 1, in embodiments.

In the embodiment depicted in FIG. 5, data from numerous data streams (data streams DS1-DSn) is obtained by or received by a metadata-based buffer input manager 506 that manages the incoming data units and their associated metadata units and places the data and metadata units into a circular buffer 508 (other types of data structures are contemplated without departing from the scope of the disclosure). The circular buffer 508 is configured to store data units and corresponding metadata units as tuples that match the number of incoming data streams. For example, in a system with two data streams (DS1, and DS2) the circular buffer may be configured to store the incoming data in tuples that correspond to the two data streams. 2-tuple 510 illustrates an entry from each of data stream DS1 and data stream DS2. In another example (not illustrated) a system with 5 input data streams, a 5-tuple circular buffer might be used. The 5-tuple circular buffer may be configured to have 5 entries that each store both a data unit and a corresponding metadata unit from a respective data stream, in embodiments.

The buffer input manager receives data units from data streams, and places the data units into corresponding entries in the circular buffer. When an entry in the circular buffer has received data for each of the data streams, the set of data for an entry (data units and corresponding metadata units for each of the data streams) may be output as meta-aligned data 514 (e.g., by a meta-aligned matchmaker 512). In embodiments, meta-aligned data may include data units from two or more different sources that have been aligned with one another based on metadata. For instance, data units from two distinct sensors may be aligned with one another using metadata associated with the data units. In embodiments, metadata that has been generated by a generation unit distinct from the data source that created the data unit may be synchronized with corresponding data units subsequent to the data units being processed (e.g., as illustrated in FIG. 1, DU/MU). A synchronized data unit/metadata unit may be aligned with another data unit/metadata unit pair based upon matching the metadata (e.g., matching timestamps). Alignment of the data unit/metadata unit pairs may be based upon other types of metadata, in embodiments.

FIG. 7 illustrates a particular technique of matching data units from various different data streams. At block 702, a new data unit with a corresponding metadata unit is received, via an interface such as DS1 interface 604, or DSn interface 606, for example. A metadata based data unit buffer entry comparator 608 may determine if there is an entry in the buffer with matching metadata (block 704). For instance, the comparator may determine whether a time stamp received along with a matching image data frame matches a time stamp already in an entry in the circular buffer. If a matching entry is found (block 704, yes) the received data unit is added to the entry in the circular buffer (block 706).

In at least the illustrated embodiments, a queue interface 610 (e.g., an API or other interface) may respond to queries about queue entries and pop or push data units and corresponding metadata units based on requests.

Additionally, complete entry detector 612 may be configured to determine whether an entry in the circular buffer is complete (block 708). In embodiments, an entry may be complete when the entry includes data and metadata for each of the data streams feeding the circular buffer. In some embodiments, an entry may be considered complete when the entry includes data and metadata for less than all of the data streams feeding the circular buffer. In some embodiments, an entry in the circular buffer may be complete when it includes a single time stamp among a number of data units equal to the number of incoming data streams (the matching time stamp for each of the data units may not need to be stored repeatedly). If an entry is not complete (block 708, no) the process may return to receive the next new data unit with a corresponding metadata unit (block 702). For complete entries (block, 708, yes) the complete entry detector 612 may output the matched data units (block 710) as Meta-aligned data 514, for example.

If no entry in the buffer has a matching metadata entry (block 704, no) the metadata based data unit buffer entry comparator may determine whether an entry in the buffer for that particular data stream includes more recent data (block 712). If there is an entry in the buffer with a more recent metadata (block 712, yes) the received data unit may be discarded (block 714). Otherwise (block 712, no) the received data unit is added to the buffer (block 716). In either case, the process may return to receive the next new data unit with corresponding metadata unit (block 702) and so on. In at least some embodiments, if a data unit for a particular data stream is received that has a time stamp subsequent to an entry needed to complete an existing entry in the buffer, that existing entry in the buffer may be eliminated or overwritten (it can be determined that the needed entry has been dropped because a later-stamped entry has arrived and the data units arrive sequentially from the data processing pipeline, in embodiments).

Meta-aligned data matchmaker 512 is illustrated with a buffer size manager 614. The buffer size manager 614 may be configured to manage the number of entries in the circular buffer, in some embodiments. For instance, the buffer size manager 614 may provide an interface for configuring the size of the buffer. A larger buffer may compensate for longer delays between the arrival of all the data units needed for completing an entry in the buffer, in embodiments. In embodiments, the buffer size manager 614 may be configured to automatically resize the number of entries in the circular buffer (e.g., when entries are being over-written without being output, when a data stream continues to provide data units later than other data streams, etc.).

Figure 8:
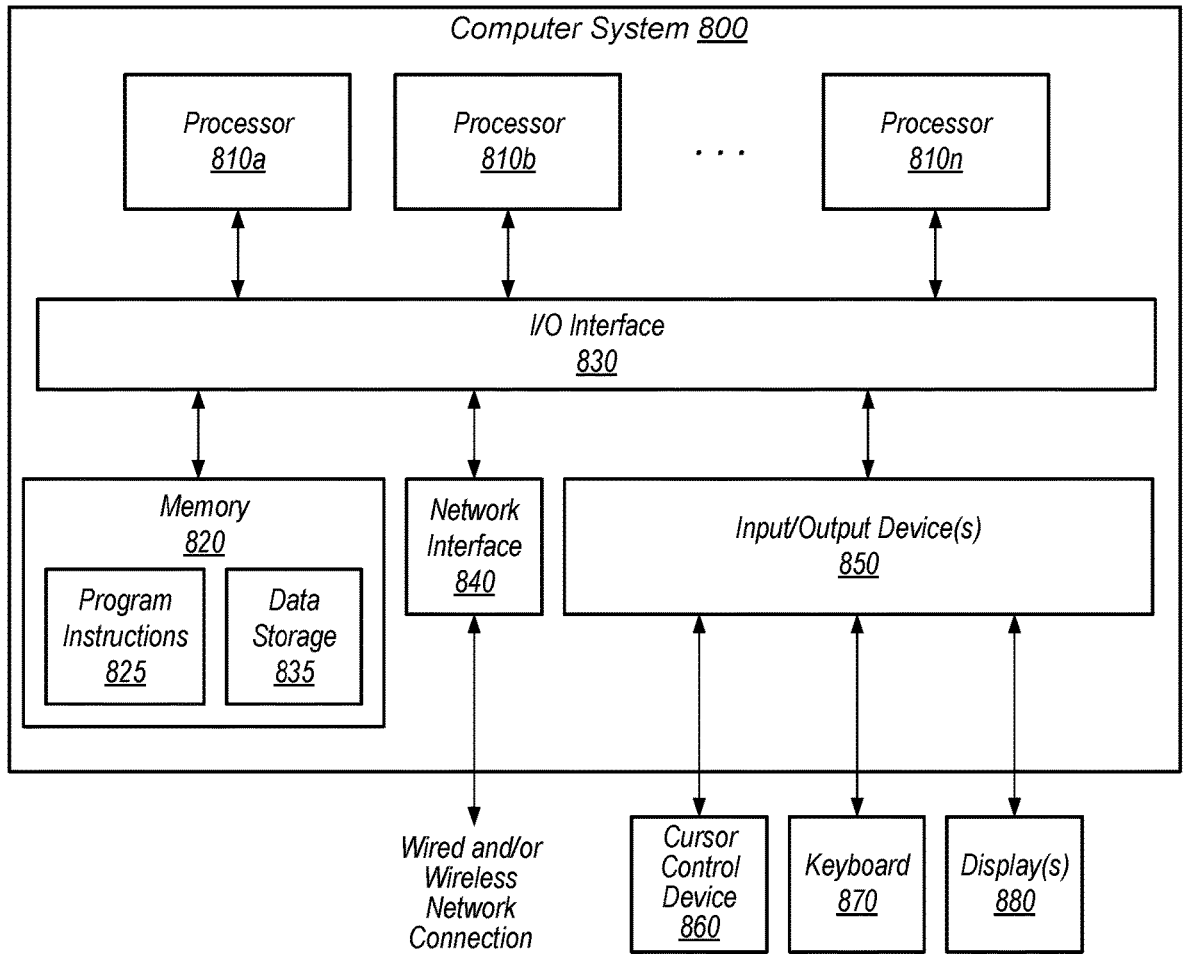
FIG. 8 is a block diagram illustrating an example computer system that implements some or all of the techniques described herein, according to different embodiments.

Various computer systems may be configured to implement the processes and techniques associated with detecting data drops, data unit-metadata synchronization, and matching of data units of distinct data streams as described herein. For example, FIG. 8 is a block diagram illustrating one embodiment of a computer system suitable for implementing some of the systems and methods described herein. In various embodiments, the data/metadata synchronizer 110, or the meta-aligned data matchmaker 512 may each be implemented by or include a computer system 800 such as that illustrated in FIG. 8.

In the illustrated embodiment, computer system 800 includes one or more processors 810 coupled to a system memory 820 via an input/output (I/O) interface 830. Computer system 800 further includes a network interface 840 coupled to I/O interface 830. In some embodiments, computer system 800 may be illustrative of servers implementing enterprise logic or downloadable application, while in other embodiments servers may include more, fewer, or different elements than computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be embedded processors implementing any of a variety of instruction set architectures (ISAs), such as the x106, PowerPC, SPARC, or MIPS ISAs, or any other suitable ISA. In multiprocessor systems, each of processors 810 may commonly, but not necessarily, implement the same ISA.

System memory 820 may be configured to store instructions and data accessible by processor 810. In various embodiments, system memory 820 may be implemented using any suitable memory technology, such as static random access memory (SRAM), synchronous dynamic RAM (SDRAM), non-volatile/Flash-type memory, or any other type of memory. In the illustrated embodiment, program instructions and data implementing desired functions, such as those methods and techniques described above for the data/metadata synchronizer 110, and/or the meta-aligned data matchmaker 512 are shown stored within system memory 820 as program instructions 825. In some embodiments, system memory 820 may include data 835 which may be configured as described herein.

In one embodiment, I/O interface 830 may be configured to coordinate I/O traffic between processor 810, system memory 820 and any peripheral devices in the system, including through network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments, some or all of the functionality of I/O interface 830, such as an interface to system memory 820, may be incorporated directly into processor 810.

Network interface 840 may be configured to allow data to be exchanged between computer system 800 and other devices attached to a network, such as other computer systems, for example. In particular, network interface 840 may be configured to allow communication between computer system 800 and/or various I/O devices 850. I/O devices 850 may include scanning devices, display devices, input devices and/or other communication devices, as described herein. Network interface 840 may commonly support one or more wireless networking protocols (e.g., Wi-Fi/IEEE 802.11, or another wireless networking standard). However, in various embodiments, network interface 840 may support communication via any suitable wired or wireless general data networks, such as other types of Ethernet networks, for example. Additionally, network interface 840 may support communication via telecommunications/telephony networks such as analog voice networks or digital fiber communications networks, via storage area networks such as Fibre Channel SANs, or via any other suitable type of network and/or protocol.

In some embodiments, system memory 820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 800 via I/O interface 830. A computer-readable storage medium may also include any volatile or non-volatile media such as RAM (e.g. SDRAM, DDR SDRAM, RDRAM, SRAM, etc.), ROM, etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

In some embodiments, I/O devices 850 may be relatively simple or "thin" client devices. For example, I/O devices 850 may be configured as dumb terminals with display, data entry and communications capabilities, but otherwise little computational functionality. However, in some embodiments, I/O devices 850 may be computer systems configured similarly to computer system 800, including one or more processors 810 and various other devices (though in some embodiments, a computer system 800 implementing an I/O device 850 may have somewhat different devices, or different classes of devices).

In various embodiments, I/O devices 850 (e.g., image sensors, scanners or display devices and other communication devices) may include, but are not limited to, one or more of: security cameras, handheld devices, devices worn by or attached to a person, and devices integrated into or mounted on any mobile or fixed equipment, according to various embodiments. I/O devices 850 may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with data/metadata synchronizer 110 or meta-aligned data matchmaker 512. In general, an I/O device 850

(e.g., cursor control device 860, keyboard 870, or display(s) 880 may be any device that can communicate with elements of computing system 800. In one embodiment, at least some of the I/O devices 850 may be configured to capture or scan or otherwise read or receive codes or identifiers of various objects and to communicate the codes to the data/metadata synchronizer 110, or meta-aligned data matchmaker 512. Such objects may include, but are not limited to, one or more of items, orders, containers or the like.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein (e.g., the functionality of the data/metadata synchronizer 110, meta-aligned data matchmaker 512, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A system, comprising:
   one or more hardware processors; and
   memory comprising program instructions to cause the one or more processors to implement:
   a data/metadata synchronizer configured to:
   obtain image frames from an image processing pipeline;
   for a given image frame of the obtained image frames:
   determine one or more statistics for a time stamp queue;
   determine, based at least in part on the one or more statistics for the time stamp queue, that a previous image frame was dropped; and discard, based at least in part on determining that the previous image frame was dropped, one or more time stamps from the time stamp queue;
   retrieve the next time stamp from the time stamp queue as a time stamp corresponding to the given image frame; and
   output the given image frame with the corresponding time stamp as synchronized metadata for the given image frame.

2. The system of claim 1, wherein to determine the previous image frame drop based on the one or more statistics the data/metadata synchronizer is further configured to compare a threshold to a depth of the time stamp queue, the depth determined at a time the image is obtained from the image processing pipeline.

3. The system of claim 1, wherein the data/metadata synchronizer is further configured to:
   perform the determine one or more statistics for the time stamp queue, the retrieve, and the output, for a number of image frames;
   determine, based at least in part on the performance of the determination of the one or more statistics for the time stamp queue, an average queue depth; and
   determine a previous image frame drop based at least in part on the average queue depth.

4. The system of claim 1,
   wherein the image frames are obtained from an image sensor device that generates the image frames without generating time stamps that correspond to the image frames;
   wherein the time stamps are generated by a time stamp generation unit distinct from the image sensor device; and
   wherein the system further comprises a trigger mechanism configured to:
   trigger the image sensor device that provides the image frames to the image processing pipeline; and
   trigger the time stamp generation unit that provides the time stamps for the time stamp queue.

5. A computer-implemented method, comprising:
   obtaining a data unit from a data unit processing pipeline;
   determining one or more statistics for a metadata queue;
   determining a previous data unit drop based at least in part on the one or more statistics for the metadata queue, wherein the previous data unit drop represents a previous data unit that was dropped prior to said obtaining the data unit;
   discarding one or more metadata units from the metadata queue;
   retrieving the next metadata unit from the metadata queue as a metadata unit corresponding to the data unit; and
   transmitting the data unit with the corresponding metadata unit.

6. The computer-implemented method of claim 5, wherein the determining the previous data unit drop based on the one or more statistics is based at least in part on comparing a threshold to a depth of the metadata queue, the depth determined at a time the data unit is obtained from the data unit processing pipeline.

7. The computer-implemented method of claim 6, wherein the threshold is a configurable parameter, the method further comprising:
   receiving, via a management interface, a value for the configurable parameter; and
   storing the value;
   where the determining the previous data unit drop based on the one or more statistics comprises determining the previous data unit drop based at least in part on the value for the configurable parameter received via the interface.

8. The computer-implemented method of claim 6, further comprising:
   performing the determining the one or more statistics for the metadata queue, the retrieving, and the transmitting, for a number of data units; and
   determining, based at least in part on the performance of the determining the one or more statistics for the metadata queue, an exponential moving average queue depth;

wherein the determining the previous data unit drop is based at least in part on the exponential moving average queue depth.

9. The computer-implemented method of claim 8, wherein the average queue depth used to determine the previous data unit drop is updated for one or more executions of the determining the one or more statistics for the metadata queue and the retrieving.

10. The computer-implemented method of claim 5, further comprising:
   triggering a data source that provides the data units to the data unit processing pipeline; and
   triggering a metadata generator that provides metadata units to the metadata queue.

11. The computer-implemented method of claim 5, wherein the data units are image frames, and wherein the metadata units are time stamps.

12. The computer-implemented method of claim 5, wherein the data units are image frames obtained from an image sensor device that generates image frames without generating time stamps that correspond to the image frames, and wherein the metadata units are time stamps generated by a time stamp generation unit distinct from the image sensor device.

13. A non-transitory computer readable storage medium storing program instructions that, when executed by at least one computer, cause the at least one computer to perform:
   obtaining a data unit from a data unit processing pipeline;
   determining one or more statistics for a metadata queue;
   determining a previous data unit drop based at least in part on the one or more statistics for the metadata queue, wherein the previous data unit drop represents a previous data unit that was dropped prior to said obtaining the data unit;
   discarding, based at least in part on the determining the previous data unit drop, one or more metadata units from the metadata queue;
   retrieving the next metadata unit from the metadata queue as a metadata unit corresponding to the data unit; and
   transmitting the data unit with the corresponding metadata unit.

14. The non-transitory computer readable storage medium of claim 13, wherein the determining the previous data unit drop based on the one or more statistics is based at least in part on comparing a threshold to a depth of the metadata queue, the depth determined at a time the data unit is obtained from the data unit processing pipeline.

15. The non-transitory computer readable storage medium of claim 14, wherein the threshold is a configurable parameter, and wherein the program instructions cause the computer to further perform:
   receiving, via a management interface, a value for the configurable parameter; and
   the determining the previous data unit drop based at least in part on the value for the configurable parameter received via the interface.

16. The non-transitory computer readable storage medium of claim 13, wherein the program instructions cause the computer to further perform:
   performing the determining the one or more statistics for the metadata queue, the retrieving, and the transmitting, for a number of data units;
   determining, based at least in part on the performing the determining the one or more statistics for the metadata queue, an average queue depth; and
   the determining the previous data unit drop based at least in part on the determined average queue depth.

17. The non-transitory computer readable storage medium of claim 16, wherein the average queue depth used to determine the previous data unit drop is updated for one or more executions of the determining the queue depth for the metadata queue and the retrieving.

18. The non-transitory computer readable storage medium of claim 13, wherein the data units are image frames, and wherein the metadata units are time stamps.

19. The non-transitory computer readable storage medium of claim 13, wherein the data units are image frames obtained from an image sensor device that generates image frames without generating time stamps that correspond to the image frames, and wherein the metadata units are time stamps generated by a time stamp generation unit distinct from the image sensor device.

20. The non-transitory computer readable storage medium of claim 13, wherein the program instructions cause the computer to further perform:
   obtaining other data units from another data unit processing pipeline;
   aligning the data unit with one of the other data units from the other data unit processing pipeline into a matched set of data units; and
   transmitting the matched set of data units together to a target destination.

21. A method, comprising:
   receiving, by a computing device from one of a plurality of distinct devices, a data unit and corresponding metadata;
   comparing, by the computing device, the corresponding metadata to metadata of one or more data units in a data unit buffer of the computing device, the one or more data units in the data unit buffer from other ones of the plurality of distinct devices;
   based on the comparing:
      based on a determination, by the computing device, that a data unit in a data unit buffer location in the data unit buffer has metadata that matches the metadata of the received data unit, adding the received data unit to the data unit buffer location of the data unit with the matching metadata; or
      based on a determination, by the computing device, that a data unit buffer location in the data unit buffer includes a data unit having more recent metadata than the received data unit, discarding the received data unit; or
      based on a determination, by the computing device, that the data unit buffer does not include a data unit having matching or more recent metadata, adding the received data unit to a new location in the data unit buffer;
   determining, by the computing device, that a data unit buffer location of the data unit buffer is a complete entry; and
   outputting the data units of the complete entry.

22. The method of claim 21, wherein:
   the complete entry includes meta-aligned data units; and
   the complete entry in the data unit buffer includes at least a color frame image and a depth frame image of a scene common to both the color frame image and the depth frame image.

23. The method of claim 21, wherein the metadata comprises a time stamp.

24. The method of claim 21, wherein the data unit buffer is a circular buffer, and wherein adding the received data unit to the new data unit buffer location in the data unit buffer comprises adding the received data unit and a corresponding metadata unit to a next data unit buffer location in circular order and overwriting a previous content of that next data unit buffer location.

25. The method of claim 24, wherein the previous content of that next data unit buffer location is an incomplete entry including a data unit for which data units with matching metadata from one or more others of the plurality of distinct devices have not been received.

26. The method of claim 21, wherein one or more of the data unit buffer locations comprises a storage location for a tuple that includes an entry corresponding to each of the plurality of distinct devices.

* * * * *